(12) United States Patent
Trutna, Jr. et al.

(10) Patent No.: US 7,016,102 B2
(45) Date of Patent: Mar. 21, 2006

(54) APPARATUS AND METHOD FOR SHIFTING THE FREQUENCY OF AN OPTICAL SIGNAL BY TWO-STAGE RAMAN SCATTERING

(75) Inventors: William Richard Trutna, Jr., Atherton, CA (US); Kenneth R. Wildnauer, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 196 days.

(21) Appl. No.: 10/795,034

(22) Filed: Mar. 5, 2004

(65) Prior Publication Data

US 2005/0195471 A1 Sep. 8, 2005

(51) Int. Cl.
*G02F 1/35* (2006.01)
*G02F 1/39* (2006.01)

(52) U.S. Cl. ..................... 359/327; 359/334
(58) Field of Classification Search ............ 359/326, 359/327, 334
See application file for complete search history.

(56) References Cited

U.S. PATENT DOCUMENTS

| | | | | |
|---|---|---|---|---|
| 6,373,621 B1 * | 4/2002 | Large et al. | ............... | 359/334 |
| 6,480,326 B1 * | 11/2002 | Papernyi et al. | ............ | 359/334 |
| 6,819,477 B1 * | 11/2004 | Tsuzaki et al. | ............. | 359/334 |
| 6,954,304 B1 * | 10/2005 | Tanaka et al. | .............. | 359/334 |
| 2003/0053192 A1 * | 3/2003 | Islam et al. | ................. | 359/327 |
| 2005/0078351 A1 * | 4/2005 | Avallone et al. | ............ | 359/334 |

FOREIGN PATENT DOCUMENTS

WO    WO 2004/019461 A1 *   3/2004

* cited by examiner

*Primary Examiner*—John D. Lee (57) ABSTRACT

An apparatus for optically shifting the frequency of an input signal beam includes a first Raman medium that receives an input signal beam, a first pump beam, and a first reference beam to responsively generate an intermediate signal beam comprising a Raman sideband of the first Raman medium. A second Raman medium is optically coupled in series with the first Raman medium. The second Raman medium receives the intermediate signal beam, a second pump beam, and a second reference beam to responsively generate an output signal beam comprising a Raman sideband of the second Raman medium. The generated output signal represents the input signal that is shifted in frequency by a frequency shift that corresponds to the frequency difference between the first and second reference beams.

29 Claims, 10 Drawing Sheets

950 Raman scattering the input signal beam responsive to a first pump beam and a first reference beam to generate an intermediate signal beam comprising a Raman sideband

960 Raman scattering the intermediate signal beam responsive to a second pump beam and a second reference beam to generate a frequency shifted output signal beam comprising a Raman sideband

FIG. 10

APPARATUS AND METHOD FOR SHIFTING THE FREQUENCY OF AN OPTICAL SIGNAL BY TWO-STAGE RAMAN SCATTERING

BACKGROUND

Modem research and technology have created major changes in the lives of many people. A significant example of this is optical communication. Over the last two decades, fiber optic lines have taken over and transformed the long distance telephone industry. Fiber optic lines also play a dominant role in making the Internet available around the world. When fiber optic lines replace copper wires for long distance calls and Internet traffic, costs are dramatically lowered and the rate at which information can be conveyed is increased.

To maximize information bandwidth, that is, the rate at which information can be transmitted, it is generally preferable for multiple information signals to be conveyed over the same optical fiber, with each information signal being conveyed as an optical signal having a different frequency. This technique is called wavelength division multiplexing (WDM).

A leading example of WDM is the standardized frequency bands for optical communication that have been established by the International Telecommunication Union (ITU), such as the "C" or conventional communication band, the "L" or long wavelength communication band, and the "S" or short wavelength communication band. The "C" communication band is widely used and includes channels that range in frequency between 191.5 and 196.25 terahertz (THz). The "L" communication band is currently a leading edge technology and includes channels between 186.5 and 192.85 THz, while the "S" communication band may become important in the future.

The "C" communication band is divided into about 24 channels that are separated in frequency by increments of about 0.2 THz, which is 200 gigahertz (GHz). If the optical communication system can support channels with frequencies that differ by an increment of only about 50 GHz, then this range can support about 96 channels.

In optical communication systems, it is sometimes necessary to shift a particular optical signal from one channel to another. Reasons for changing the channel of an optical signal include, for example, the following:

Routing considerations: for example, conveying an optical signal on a first fiber optic line from Boston to New York City using a first channel and then conveying the same signal on a second fiber optic line from New York City to San Francisco using a second channel because, for example, the channel is occupied on the second line;

Transitioning from a first optical communication system that supports one set of channels to a second system that supports a different set of channels, for example, from the "C" communication band to the "L" communication band;

Compensating for failures in the communication system equipment; or

Transitioning between optical communication systems that operate with different frequency increments between channels.

Currently, a common method for shifting the frequency of an optical signal requires the regeneration of the optical signal. For example, the frequency shift of an optical signal may be accomplished by first converting the optical signal into an electronic signal, and then re-converting the electronic signal into another optical signal having the desired frequency. This conversion from optical to electrical and then electrical to optical requires knowing certain characteristics of the modulation of an optical carrier such as the particular bit format and frequency range of the modulation. This can be overly restrictive in some applications. Although frequency shifting using reconverted optical signals may be useful in many applications, these systems are expensive to operate and maintain.

SUMMARY OF THE INVENTION

In accordance with some embodiments of the invention, an apparatus for optically shifting the frequency of an input signal beam includes a first Raman medium that receives an input signal beam, a first pump beam, and a first reference beam to responsively generate an intermediate signal beam comprising a Raman sideband of the first Raman medium. The frequency difference between the pump beam and the first reference beam will typically be within half a Raman linewidth of the Raman frequency of the medium to be effective in generating the intermediate signal beam. A second Raman medium is optically coupled in series with the first Raman medium. The second Raman medium receives the intermediate signal beam, the first pump beam, and a second reference beam to responsively generate an output signal beam comprising a Raman sideband of the second Raman medium. The generated output signal represents the input signal that is shifted in frequency by a frequency shift that corresponds to the frequency difference between the first and second reference beams. The total tuning range of the output signal is approximately twice the Raman linewidth, a property of the Raman medium. Silica fiber, for example, has a Raman linewidth of about 8 THz, which is double the width of the "C" communications band.

BRIEF DESCRIPTION OF THE DRAWING

The above and other aspects, features and advantages of the present invention will become more apparent upon consideration of the following description of preferred embodiments taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. Other embodiments may be utilized, and structural, electrical, as well as procedural changes may be made without departing from the scope of the present invention.

Figure 1:
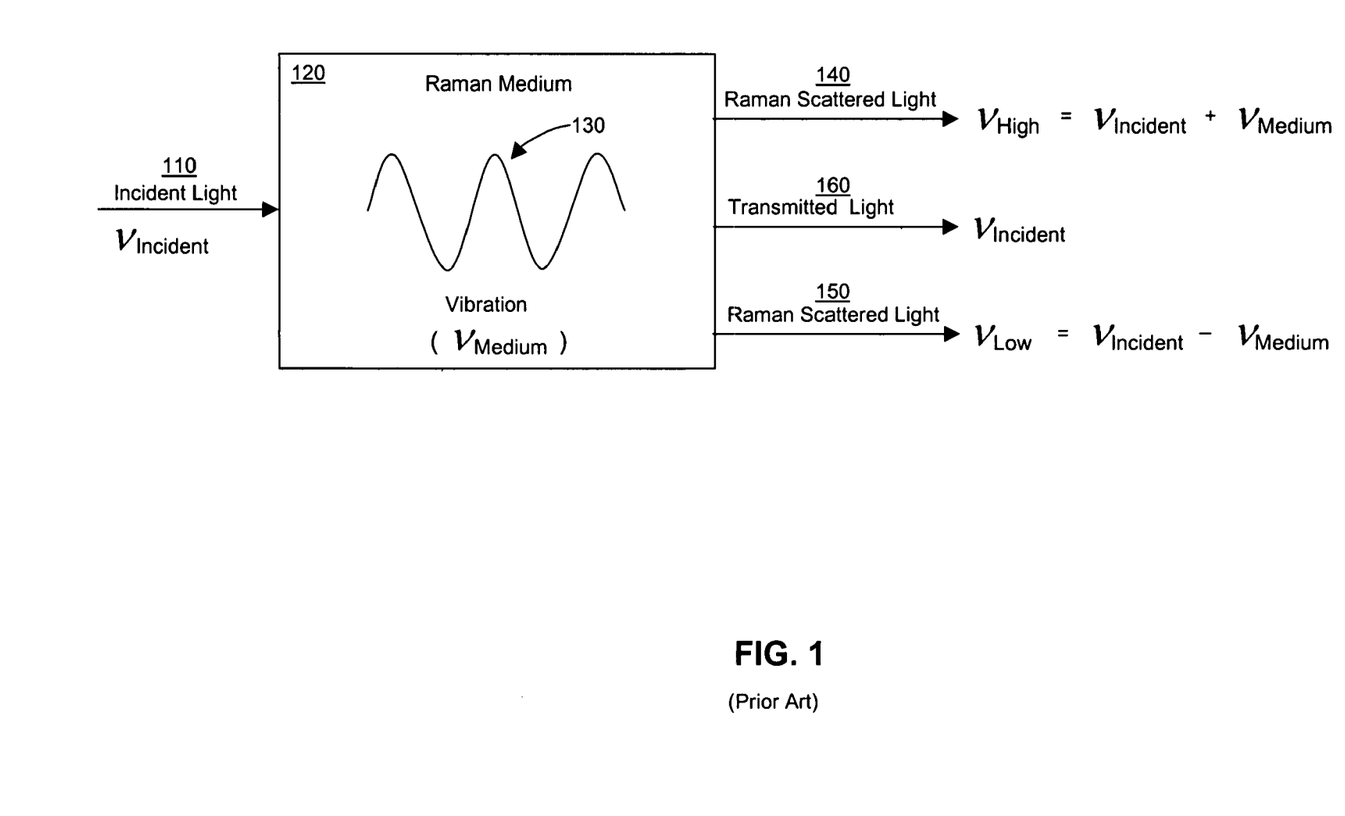
FIG. 1 is a diagram showing the effect of Raman scattering on light introduced to a Raman medium.

FIG. 1 is a diagram showing the effect of Raman scattering on light introduced to a Raman medium. In this figure, incident light 110 at frequency $v_{Incident}$ is presented to Raman medium 120. The Raman medium denotes an optical medium that produces Raman scattering of incident light, and may be a gas, a liquid, or a solid. Particular examples of a Raman medium include an optical fiber, an optical waveguide containing a Raman medium such as benzene or hydrogen, crystalline materials, and silica-based devices, among others. The Raman media may also be implemented using a hollow glass fiber that is filled with benzene, or a liquid cell located within an optical resonator. Known liquid Raman media include chlorobenzene, toluene, cyclohexane, acetone, ethanol, and water. Solid Raman media include quartz, lithium niobate, diamond, polystyrene, and calcite. Stimulated Raman scattering can also be achieved in oxygen, nitrogen, hydrogen, carbon monoxide, and methane.

The Raman medium is characterized by molecular or crystal lattice vibration (phonon) 130 having a frequency of $v_{Medium}$. The vibration results from the Raman scattering properties of Raman medium 120 when stimulated by incident light. The vibration may be characterized by the movement of the molecules of the medium or optical phonon vibration in a crystalline structure within the medium.

Incident light 110 propagates through Raman medium 120, resulting in transmitted light 160 and frequency-shifted scattered light 140 and 150. Scattered light 140 is emitted at an upper Raman sideband having a frequency of $v_{High}$, where:

$$v_{High} = v_{Incident} + v_{Medium} \quad \text{(Eq. 1)}$$

The Raman upper sideband is also known as the anti-Stokes wave or the anti-Stokes shift.

Scattered light 150 is emitted at a lower Raman sideband having a frequency of $v_{Low}$, where:

$$v_{Low} = v_{Incident} - v_{Medium} \quad \text{(Eq. 2)}$$

The lower Raman sideband is known as the Stokes wave, the Stokes shift, non-linear scattering, or inelastic scattering.

Typically, Raman medium 120 also transmits incident light 110 which emerges as transmitted light 160 having the same frequency as incident light 110. The intensity of light produced by the Raman scattering process can differ between the upper and the lower sidebands. The intensity of the light produced by Raman scattering may range from negligible to being substantially equal to the intensity of the incident light. Raman scattering produced according to the optical configuration depicted in FIG. 1 is generally not suitable for wavelength shifting of optical signals since the frequency shift produced by a single Raman scattering device is typically much larger than what is needed for practical use in optical communications.

Figure 2:
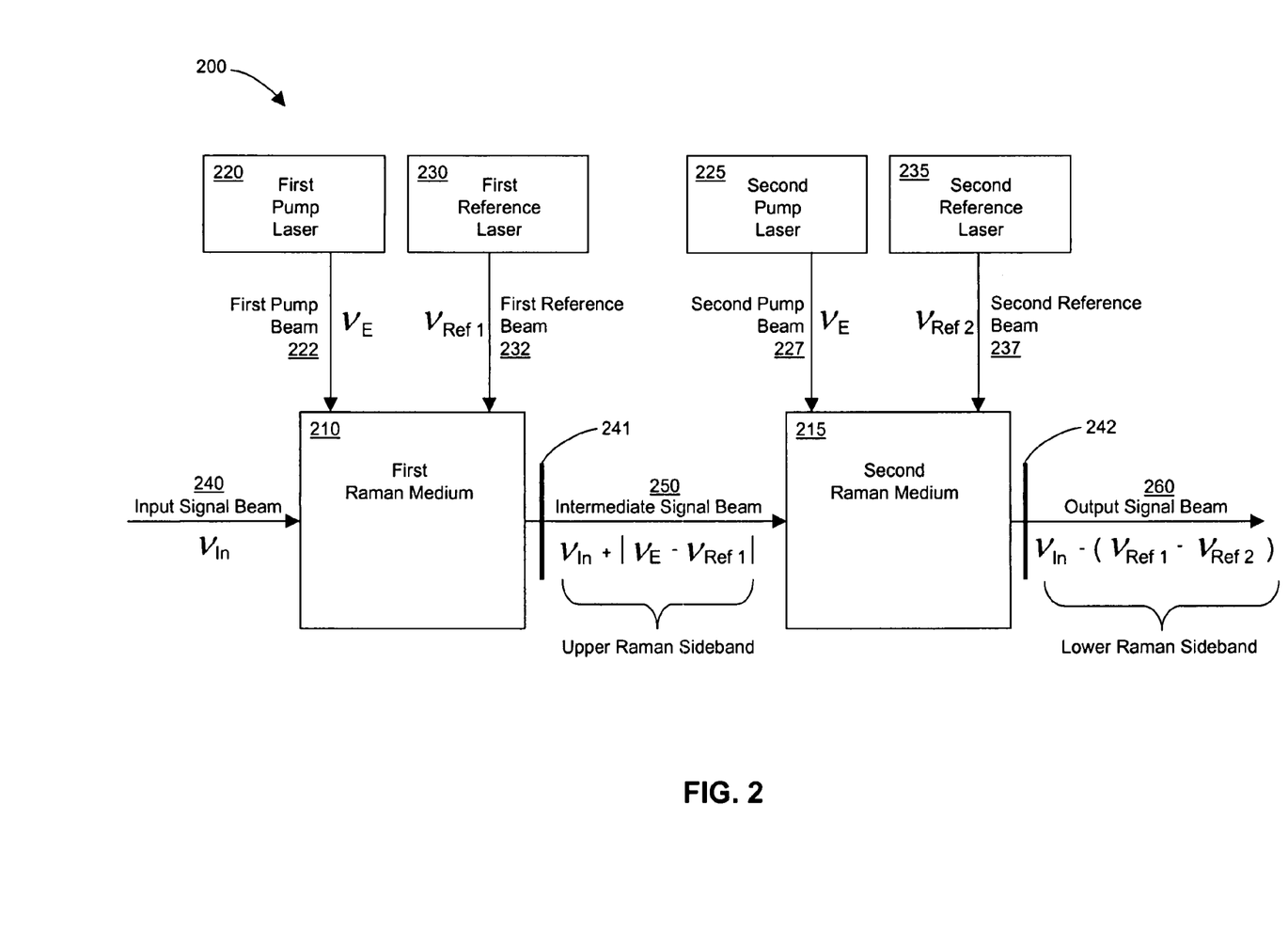
FIG. 2 is a block diagram of a device for shifting the frequency of a signal beam in accordance with one embodiment of the invention.

FIG. 2 is a block diagram of device 200 for shifting the frequency of a signal beam in accordance with one embodiment of the invention. This figure illustrates exemplary frequencies of the various light beams propagating through the device. In general, device 200 includes first Raman medium 210 receiving first pump beam 222 and first reference beam 232, which are generated by first pump laser 220 and first reference laser 230, respectively. Second Raman medium 215 is shown receiving second pump beam 227 and second reference beam 237, which are generated by second pump laser 225 and second reference laser 235, respectively.

Similar to Raman medium 120 depicted in FIG. 1, first and second Raman media 210 and 215 may be implemented using almost any type of optical medium that produces Raman scattering of incident light. Typically, the first and second Raman media are the same type of medium, but this is not a requirement.

First and second pump lasers 220 and 225 may each be implemented using conventional pump light sources. Examples of suitable pump light sources include a laser diode, a neodymium doped yttrium aluminum garnet (Nd:YAG) laser, and the like. First and second reference lasers 230 and 235 may each be implemented using a laser similar to the pump lasers.

The first pump laser and the first reference laser generate light at frequencies $v_E$ and $v_{Ref\,1}$, respectively. Similarly, the second pump laser and the second reference laser generate light at frequencies $v_E$ and $v_{Ref\,2}$, respectively. Typically, first and second pump lasers 220 and 225 generate light at the same frequency ($v_E$), while first and second reference lasers 230 and 235 generate light at different frequencies such that $v_{Ref\,1}$ differs from $v_{Ref\,2}$. As will be described in more detail below, the frequency difference between $v_{Ref\,1}$ and $v_{Ref\,2}$ defines the frequency shift of output signal beam 260, relative to the frequency of input signal beam 240. If desired, the frequency shift of the output signal beam may be controlled by tuning the frequency of the light generated by the second reference laser, the first reference laser, or both. For convenience, further description of device 200 will be made with reference to the first and second Raman media implemented using optical fiber, but it is to be understood that the disclosed principles apply equally to other types of Raman media.

In a particular example, the first and second Raman media are implemented as spans of optical fiber that convey optical signals from one location to another for communication purposes. Although no particular length of optical fiber is required, the length of the fiber should be sufficient to allow enough Raman scattering to occur so that the generated intermediate and output signal beams are sufficiently intense for a desired application. In one specific and non-limiting configuration, a span of optical fiber having a length of at least 1 kilometer is used to implement each of the first and second Raman media.

In operation, first Raman medium 210 receives two light beams respectively generated by first pump laser 220 and first reference laser 230. The frequency difference between these light beams approximates the Raman vibrational mode of first Raman medium 210. A frequency difference of about 13 THz between the light beams generated by the first pump laser and the first reference laser corresponds to the silica glass Raman vibrational mode of the optical fiber constituting first Raman medium 210. The frequency difference can be within about 4 THz on either side of the 13 THz nominal Raman frequency because of the broad 8 THz Raman linewidth in fused silica.

In addition to the other light beams, input signal beam 240 is also introduced to the first Raman medium and will mix with the 13 THz vibration to generate an upper Raman sideband (anti-Stokes shift) and a lower Raman sideband (Stokes shift). In the current example, the lower Raman sideband is not used and is filtered out using filter 241 interposed between Raman media 210 and 215.

In FIG. 2, intermediate signal beam 250 is the upper Raman sideband generated by the first Raman medium and filtered by filter 241. The frequency of the intermediate signal beam is given by:

$$\nu_{Int}=\nu_{In}+|\nu_E-\nu_{Ref\,1}| \quad\quad\quad\quad (\text{Eq. 3})$$

where $\nu_{Int}$ is the frequency of the intermediate signal beam, $\nu_{In}$ is the frequency of the input signal beam, $\nu_E$ is the frequency of the light generated by the first pump laser, and $\nu_{Ref\,1}$ is the frequency of the light beam generated by the first reference laser. Eq. 3 illustrates that the frequency shift of the input signal beam $\nu_{In}$ depends on the frequency difference between the light beams generated by the first pump laser and the first reference laser, and in particular, the frequency difference between $\nu_E$ and $\nu_{Ref\,1}$.

Second Raman medium 215 is shown receiving the intermediate signal beam and additionally receiving two light beams respectively generated by second pump laser 225 and second reference laser 235. The second pump laser and the second reference laser generate light at frequencies $\nu_E$ and $\nu_{Ref\,2}$, respectively. Notably, the light generated by the first and second pump lasers has the same (or substantially the same) frequency, while the light generated by the first reference laser and the light generated by the second reference laser have different frequencies.

Similar to the light generated by the first pump laser and the first reference laser, the frequency difference between the light beams generated by the second pump laser and the second reference laser should approximate the Raman vibrational mode of second Raman medium 215. A frequency difference of about 13 THz between this second pair of light beams corresponds to the Raman vibrational mode of the optical fiber of second Raman medium 215.

The intermediate signal beam generated by the first Raman medium in an up-conversion process is introduced to the second Raman medium and mixes with the 13 THz vibration to generate an upper Raman sideband and a lower Raman sideband. In contrast to the generation of the intermediate signal beam, the lower Raman sideband is the desirable signal and is used as output signal beam 260. The upper Raman sideband is not used and is filtered out using filter 242. Reasons for alternating between upper and lower Raman sidebands are described in more detail below.

The frequency of the output signal beam is given by:

$$\nu_{Out}=\nu_{In}-(\nu_{Ref\,1}-\nu_{Ref\,2}) \quad\quad\quad\quad (\text{Eq. 4})$$

where $\nu_{Out}$ is the frequency of the output signal beam, $\nu_{In}$ is the frequency of the input signal beam, $\nu_{Ref\,1}$ is the frequency of the light generated by the first reference laser, and $\nu_{Ref\,2}$ is the frequency of the light generated by the second reference laser. Eq. 4 illustrates that the frequency shift applied to the input signal beam $\nu_{In}$ is equal to the frequency difference between the light beams generated by the first and second reference lasers, and in particular, the frequency difference between $\nu_{Ref\,1}$ and $\nu_{Ref\,2}$.

The difference between the frequency shift achieved during the up-conversion process (upper Raman sideband) and the frequency shift achieved during the down-conversion process (lower Raman sideband) represents the net frequency shift of input signal beam 240. In the current example of FIG. 2, the input signal beam is frequency shifted by a frequency shift equal to $\nu_{Ref\,1}-\nu_{Ref\,2}$. The frequency shift is defined by choosing the frequencies of first reference laser 230 and second reference laser 235. If the frequency difference is positive, then the output signal beam is shifted up in frequency. On the other hand, if the frequency difference is negative, then the output signal beam is shifted down in frequency. The only constraint on the magnitude of the frequency shift is the Raman linewidth, which is material dependent. Again, the Raman linewidth of silica fiber is about 8 THz, which defines the approximate range of frequency differences.

Alternating between upper and lower sidebands is necessary to achieve a desired frequency shift of the input signal beam. If upper sidebands were used in both Raman media, then the resulting frequency shift would be so great that it would be of little or no use in optical communications, as would be the frequency shift if the lower sidebands were used in both media.

The device depicted in FIG. 2 generates a frequency shifted output signal beam 260 which results from an up-conversion process followed by a down-conversion process. An alternative to this design may be implemented by reversing the sequence of the conversion process such that the frequency-shifted output signal beam is generated using a down-conversion processes followed by an up-conversion process. An example of such a design is depicted in FIG. 3.

Figure 3:
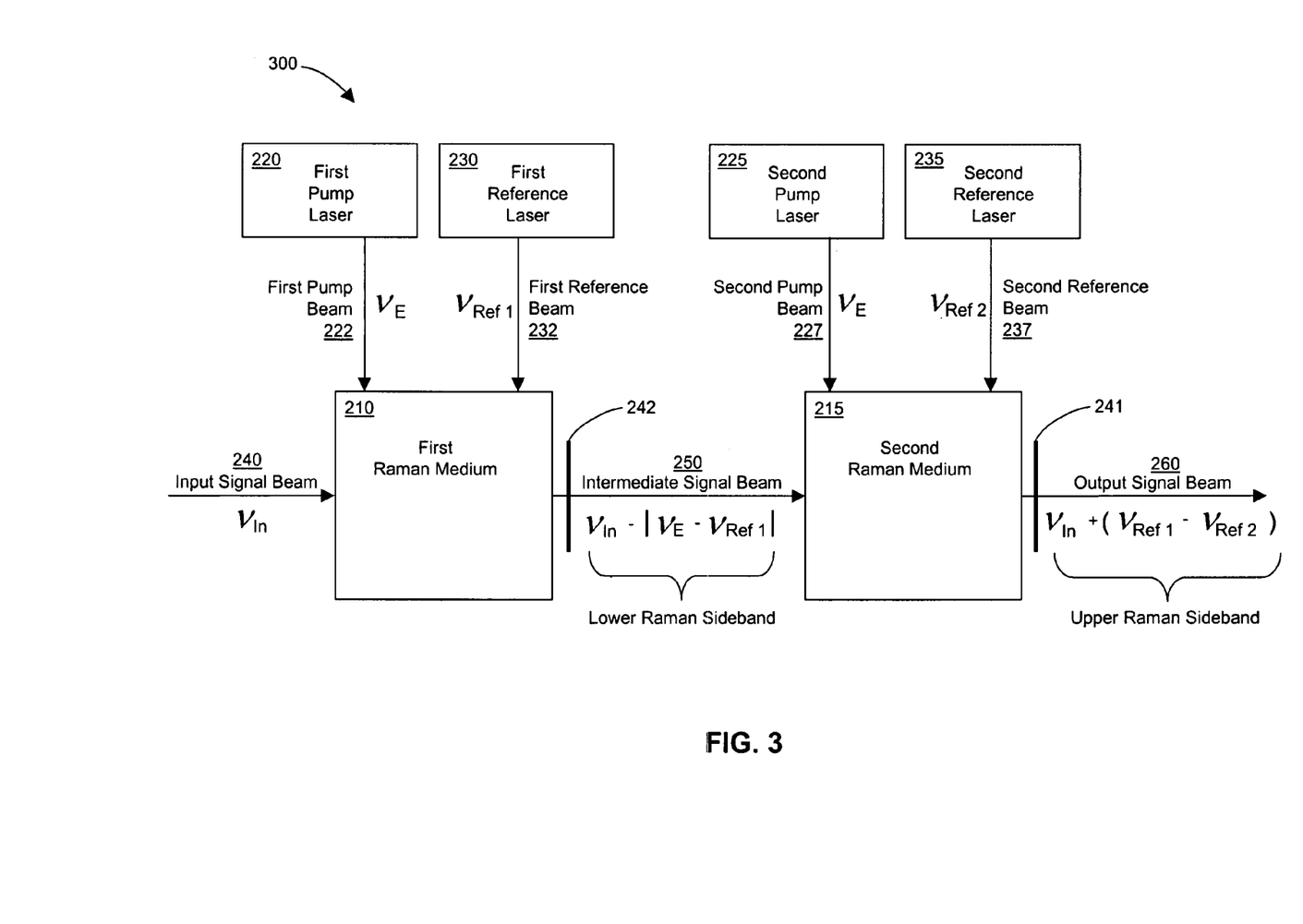
FIG. 3 is a block diagram of a device for shifting the frequency of a signal beam in accordance with an alternative embodiment of the invention.

As shown in FIG. 3, device 300 is configured in a manner that is similar to device 200 of FIG. 2, the primary difference being the relative positioning of filters 241 and 242. In this figure, filter 242 is positioned between first Raman medium 210 and second Raman medium 215, and filter 241 is positioned to receive Raman scattered light generated by second Raman medium 215.

In a down-conversion process, filter 242 filters the upper Raman sideband of first Raman medium 210 to generate intermediate signal beam 250. In this embodiment, intermediate signal beam 250 is the lower Raman sideband of the first Raman medium. The frequency of the intermediate signal beam in this example is given by:

$$\nu_{Int}=\nu_{In}-|\nu_E-\nu_{Ref\,1}| \quad\quad\quad\quad (\text{Eq. 5})$$

where $\nu_{Int}$ is the frequency of the intermediate signal beam, $\nu_{In}$ is the frequency of the input signal beam, $\nu_E$ is the frequency of the light generated by the first pump laser, and $\nu_{Ref\,1}$ is the frequency of the light generated by the first reference laser. The difference between Eq. 3 and Eq. 5 relates to the sign of the absolute value of the frequency difference of $\nu_E$ and $\nu_{Ref\,1}$. In Eq. 3, which is an up-conversion process using an upper Raman sideband, the frequency difference is added to the frequency of the input signal beam ($\nu_{In}$). In contrast, Eq. 5 is a down-conversion process using a lower Raman sideband where the frequency difference is subtracted from the frequency of the input signal beam ($\nu_{In}$).

In an up-conversion process, filter 241 filters the lower Raman sideband of second Raman medium 215 to generate output signal beam 260. In this setup, output signal beam 260 is the upper Raman sideband of the second Raman medium. The frequency of the output signal beam is given by:

$$v_{Out}=v_{In}+(v_{Ref\ 1}-v_{Ref\ 2}) \quad \text{(Eq. 6)}$$

where $v_{Out}$ is the frequency of the output signal beam, $v_{In}$ is the frequency of the input signal beam, $v_{Ref\ 1}$ is the frequency of the light generated by the first reference laser, and $v_{Ref\ 2}$ is the frequency of the light generated by the second reference laser. As before, the frequency shift of the input signal beam $v_{In}$ correlates to the frequency difference between the light beams generated by the first and second reference lasers. Accordingly, the device depicted in FIG. 3 generates a frequency shifted output signal beam 260 using a down-conversion process (lower Raman sideband) followed by an up-conversion process (upper Raman sideband). As a consequence, the frequency shift provided by device 300 has an opposite sign compared to the frequency shift provided by device 200 depicted in FIG. 2.

Figure 4:
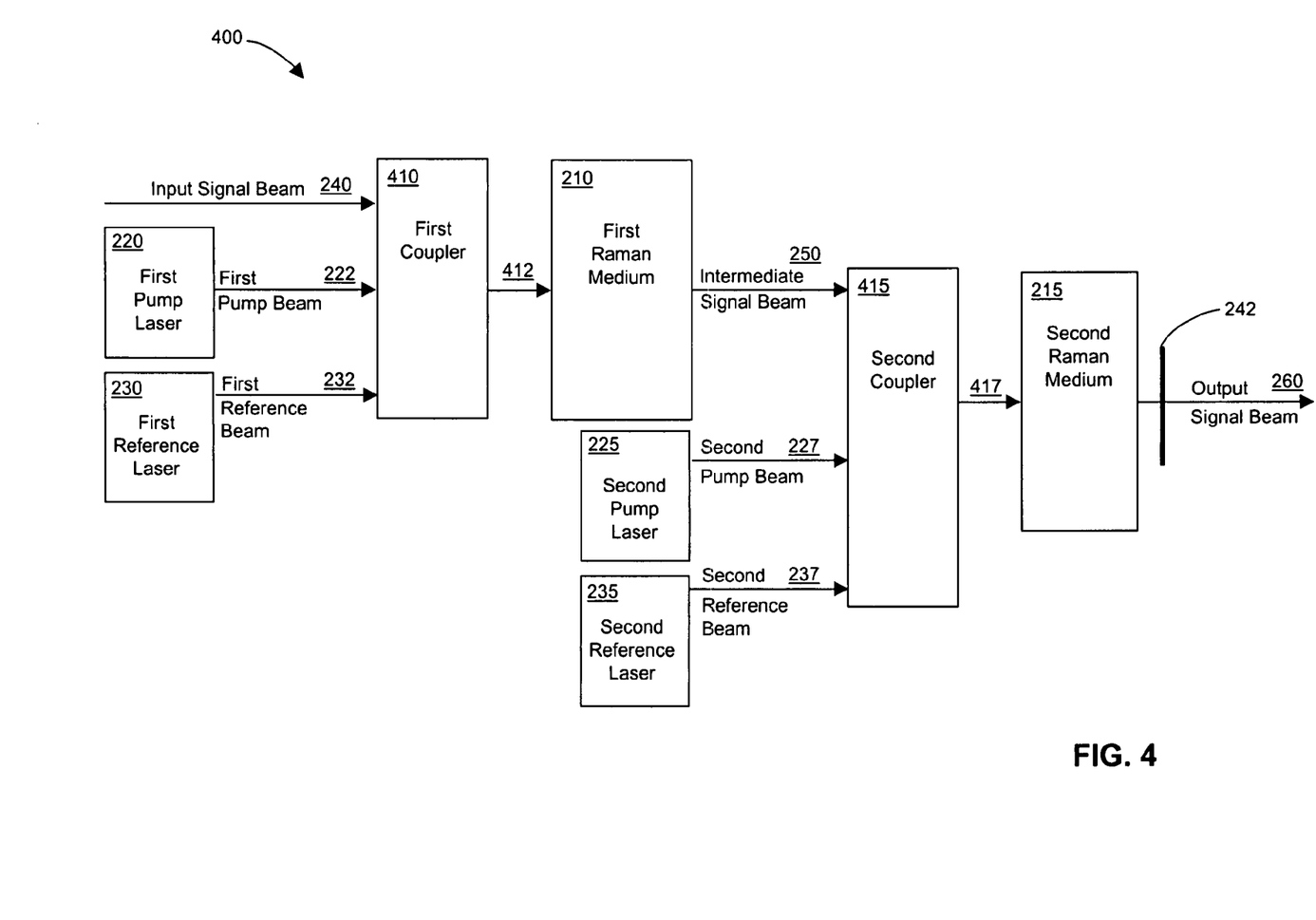
FIG. 4 is a block diagram of a device for shifting the frequency of a signal beam using optical couplers, in accordance with an embodiment of the invention.

FIG. 4 is a block diagram of device 400, which is similar in many respects to the device shown in FIG. 3. The primary difference between these devices is that device 400 utilizes optical couplers to introduce the various light beams into the Raman media. For example, first coupler 410 is shown receiving input signal beam 240, first pump beam 222, and first reference beam 232. Similarly, second coupler 415 is shown receiving intermediate signal beam 250, second pump beam 227, and second reference beam 237.

First and second couplers 410 and 415 may be implemented using conventional optical devices that couple received light beams so that they copropagate within the respective Raman medium. Particular examples of suitable optical devices include beam splitters, frequency sensitive optical couplers, diffraction gratings, fiber couplers, and optical multiplexers, among others. Typically, first and second couplers 410 and 415 are implemented using the same or similar types of optical devices, but this is not critical to the invention.

If desired, one or more of the optical couplers may also filter, de-multiplex, or otherwise remove unwanted frequencies from the light injected into the respective Raman media. For example, second optical coupler 415 may filter intermediate signal beam 250 emitted by the first Raman medium so that the input signal beam, the first pump beam, the first reference beam, and the unused Raman sideband are not introduced into the second Raman medium. Alternatively, the removal of unwanted frequencies of light emitted by the first Raman medium may be accomplished using a filter that is independent of the optical coupler. Similarly, any unwanted frequencies of light emitted from second Raman medium 215 are removed from the output signal beam using filter 242.

During operation, first coupler 410 spatially overlaps input signal beam 240, first pump beam 222, and first reference beam 232 to form a copropagating beam 412 which is introduced to first Raman medium 210. Second coupler 415 then receives intermediate beam 250, second pump beam 227, and second reference beam 237. Note that the intermediate beam may be either an upper or lower Raman sideband of the first Raman medium, as described above in reference to FIGS. 2 and 3.

Similar to first coupler 410, second coupler 415 spatially overlaps intermediate signal beam 250, second pump beam 227, and second reference beam 237 to form a copropagating beam 417 which is introduced to second Raman medium 215.

In embodiments in which intermediate beam 250 is the upper Raman sideband (up-conversion process), the generated output signal beam 260 is the lower Raman sideband of the second Raman medium 215 (down-conversion process). Conversely, in embodiments in which the lower Raman sideband of first Raman medium 210 is used to generate the intermediate beam 250, the upper Raman sideband of the second Raman medium is used to generate the output signal beam 260.

Figure 5:
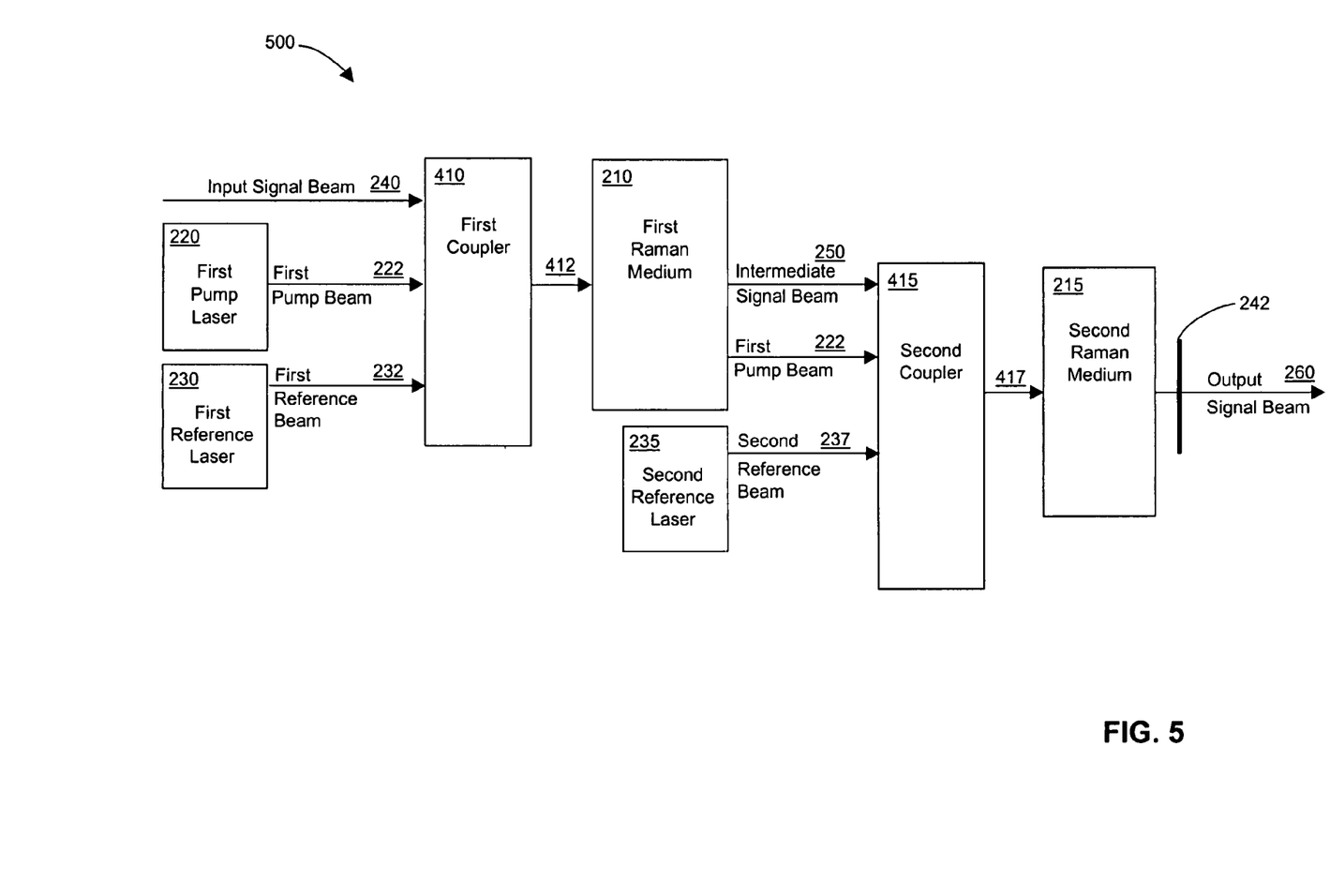
FIG. 5 is a block diagram of a device for shifting the frequency of a signal beam using a single pump beam, in accordance with an embodiment of the invention.

FIG. 5 is a block diagram of device 500 for shifting the frequency of a signal beam in accordance with an alternative embodiment of the invention. The primary difference between device 500 and the previously described embodiments relates to the number of pump beams used. The embodiments described above utilize first and second pump lasers. In contrast, device 500 uses a single pump laser 220.

Such a design is possible since first pump beam 222 generated by first pump laser 220 typically has sufficient intensity after propagating through first Raman medium 210 that it adequately excites second Raman medium 215. Since the first pump beam is reused in the second Raman medium, the necessary frequency difference is typically achieved by generating first reference beam 232 and second reference beam 237 at different frequencies. The embodiment shown in FIG. 5 provides a simpler device since it uses only a single pump laser.

Similar to other embodiments, device 500 operates by down-converting and then up-converting the signal beams emitted by the first and second Raman media. However, since the up-converting process is typically less efficient than the down-converting process, up-converting first and then down-converting will eliminate operational problems that may arise with the use of an attenuated pump beam in the second Raman medium. For convenience, intermediate signal beam 250 and first pump beam 222 are shown exiting first Raman medium 210 as two separate beams, but in a typical setup these beams copropagate by virtue of first coupler 410.

In general, efficiently frequency shifting of an input signal requires each of the light beams passing through a particular Raman medium to have the same or substantially the same propagation velocity. The phase velocity of the beams depends upon the refractive index of the Raman medium, which in turn depends upon the frequency of the light.

A difference in the propagation velocities of the various light beams, which will be referred to as a phase error, may impair the efficiency of the frequency shifting. In these situations, a suitable device or procedure may be implemented to correct the phase error of one or more of the light beams propagating through the Raman medium. One technique for correcting phase error is to control the dispersion of the Raman medium by modulating or otherwise changing the refractive index of the Raman medium, as will now be described.

Figure 6:
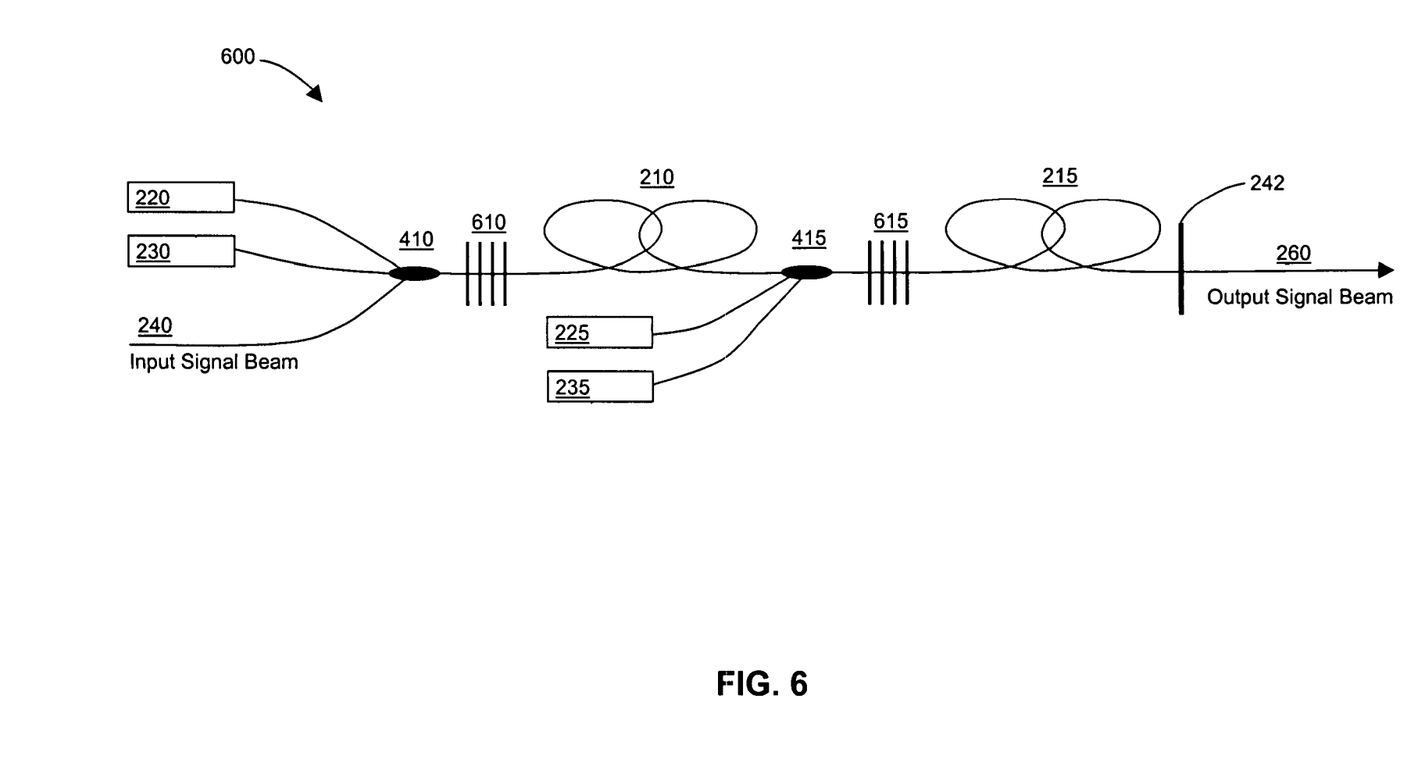
FIG. 6 is a block diagram of a device for shifting the frequency of a signal beam using fiber Bragg gratings, in accordance with an embodiment of the invention.

FIG. 6 is a block diagram of device 600 that generates a frequency shifted output signal beam in accordance with an alternative embodiment of the invention. Device 600 is similar in many respects to the device shown in FIG. 4, with the main distinction relating to the use of fiber Bragg gratings (FBGs). For example, FIG. 6 shows first Raman medium 210 configured with first FBG 610, and second Raman medium 215 configured with second FBG 615.

The FBGs are shown formed in a portion of the overall length of the optical fibers constituting the first and second Raman media. However, in practical implementations, the FBGs are typically distributed over the entire length, or substantially the entire length, of the optical fibers constituting the Raman media. FIG. 6 shows the first and second Raman media each configured with a single FBG, (for example, FGB 610 or 615). A possible alternative is to configure the first Raman medium, the second Raman medium, or both, with more than one FBG.

In operation, each FBG acts as a dispersion compensator for the frequency of one of the propagating light beams. Put another way, the FBG changes the effective refractive index of the optical fiber Raman medium to modulate the propagation velocity of a particular light beam to correct any phase error that may be present.

The four primary light beams propagating through each Raman medium are the signal beam, the pump beam, the reference beam, and the upper or lower Raman sidebands. Using first Raman medium 210 as an example, the dispersion characteristics of the medium are such that the phase error between the first pump beam and the other beams is greater than desired. To compensate for the phase error, first Raman medium 210 incorporates FBG 610 that modifies the refractive index of the first Raman medium at the frequency of the first pump beam. The change in refractive index provided by FBG 610 causes a corresponding change in propagation velocity, which reduces or eliminates the phase difference between the first pump beam and the other light beams, thereby resulting in a desired phase-matched condition.

Similarly, second Raman medium 215 may incorporate FBG 615 that modifies the refractive index of second Raman medium 215 at the frequency of the second pump beam, for example. The change in refractive index provided by FBG 615 changes the propagation velocity of the second pump beam, resulting in the reduction or elimination of the phase difference between the second pump beam and the other light beams. Thus, FBG 615 provides the desired phase matching condition of the various light beams propagating through the second Raman medium.

FBGs 610 and 615 may be implemented using conventional FBG devices. In general, a suitable FBG is implemented by imposing a periodic variation in refractive index along the length of the optical fiber. A FBG may be formed in the fiber using well known techniques, the most common technique being the use of ultraviolet light to irradiate the fiber.

A FBG having a periodic variation in refractive index reflects light beams with wavelengths that are approximately twice the period of the variation. The width of the FBG stopband, that is, the range of frequencies that are reflected, depends on the length of the FBG and on the grating strength, that is, the magnitude of the index variation. The stopband of a FBG is quite narrow in practice. Typical stopband widths for a FBG with a stopband centered at frequencies in the "C" communication band range from a few hundred megahertz (MHz) to a few gigahertz (GHz). The dispersion of an FBG can compensate for and counteract the dispersion of the Raman medium because a FBG disperses light beams at frequencies that are de-tuned slightly from the stopband.

As previously described, removal of the unwanted frequencies of light emitted by the first Raman medium may be accomplished using a filter that is integrated with optical coupler 415, or such filtering may be accomplished using a filter (for example, filter 241) that is independent of the optical coupler. In addition, or as an alternative to either of these filtering techniques, FBG 615 may also be configured to filter out the unwanted frequencies of light (for example, the upper or lower Raman sideband).

Figure 7:
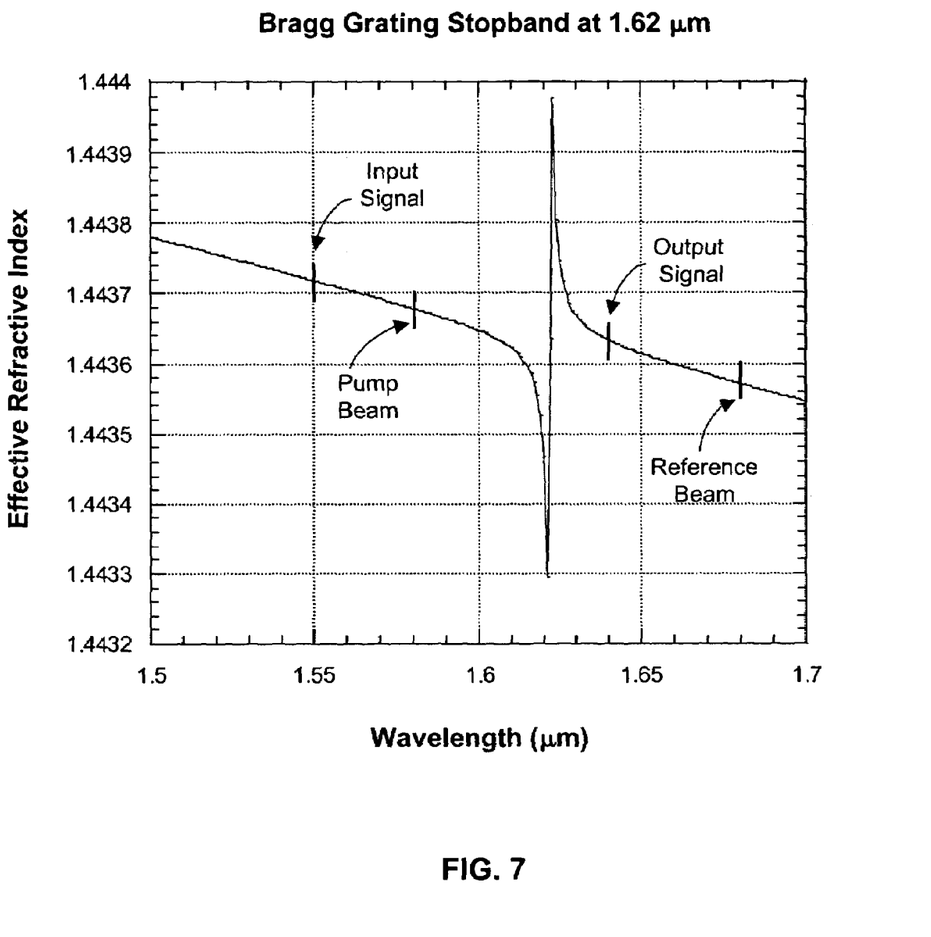
FIG. 7 is a graph showing the effective index of refraction of a Raman medium relative to the wavelength of light propagating through the Raman medium.

FIG. 7 is a graph showing the relationship between the effective index of refraction and wavelength that may be obtained using a suitably configured FBG. In the specific example depicted in this graph, the wavelength of the pump beam is 1.58 $\mu$m, the wavelength of the reference beam is 1.68 $\mu$m, the wavelength of the input signal beam is 1.55 $\mu$m, and the wavelength of the output signal beam is 1.64 $\mu$m. This particular FBG has a stopband of about 1.62 $\mu$m. These conditions provide a near-zero phase error between the light beams and therefore a very efficient Raman frequency conversion. A typical FBG can only provide a small change in the refractive index, but this is not problematic since only small changes are ordinarily needed for phase matching the various light beams.

Referring back to FIG. 6 as an example, and as previously noted, it is possible to incorporate more than one FBG into first Raman medium 210, second Raman medium 215, or both. Such a configuration is typically implemented whenever the modulation of the propagation velocity of more than one light beam is required or desired.

Configuring a Raman medium with more than one FBG may be accomplished by concatenating the FBGs along the optical fiber of the Raman medium, combining the functionality of two or more FBGs into a single FBG, or by other similar techniques. A typical concatenating technique is where the length of the optical fiber is divided into a series of sections. Each section is configured with one of the FBGs. In a specific example, four FBGs are configured in adjacent sections of the optical fiber to form a section group. This section group is repeated periodically along the length of the optical fiber. At the end of each section group, the light beams propagating through the optical fiber Raman medium have the same, or substantially the same velocity.

In a possible technique for combining FBGs, the dispersion characteristics of multiple FBGs are combined into a single FBG by spatially overlaying the patterns of the FBGs. The resulting single FBG has a pattern of changes in refractive index along its length. Similar to the concatenated FBG configuration, the combined FBG cause the light beams to propagate through the optical fiber Raman medium at the same or substantially the same velocity.

In a specific non-limiting example, the first Raman medium is configured with four separate FBGs, each configured to modulate the propagation velocity of one of the four light beams that propagate through the Raman medium, i.e., the input signal beam, pump beam, reference beam, and intermediate signal beam.

Each of the FBGs modifies the refractive index of the first Raman medium at the frequency of its associated light beam. As before, the change in refractive index provided by each FBG causes a corresponding change in propagation velocity, which reduces or eliminates the phase difference between the various light beams.

Figure 8:
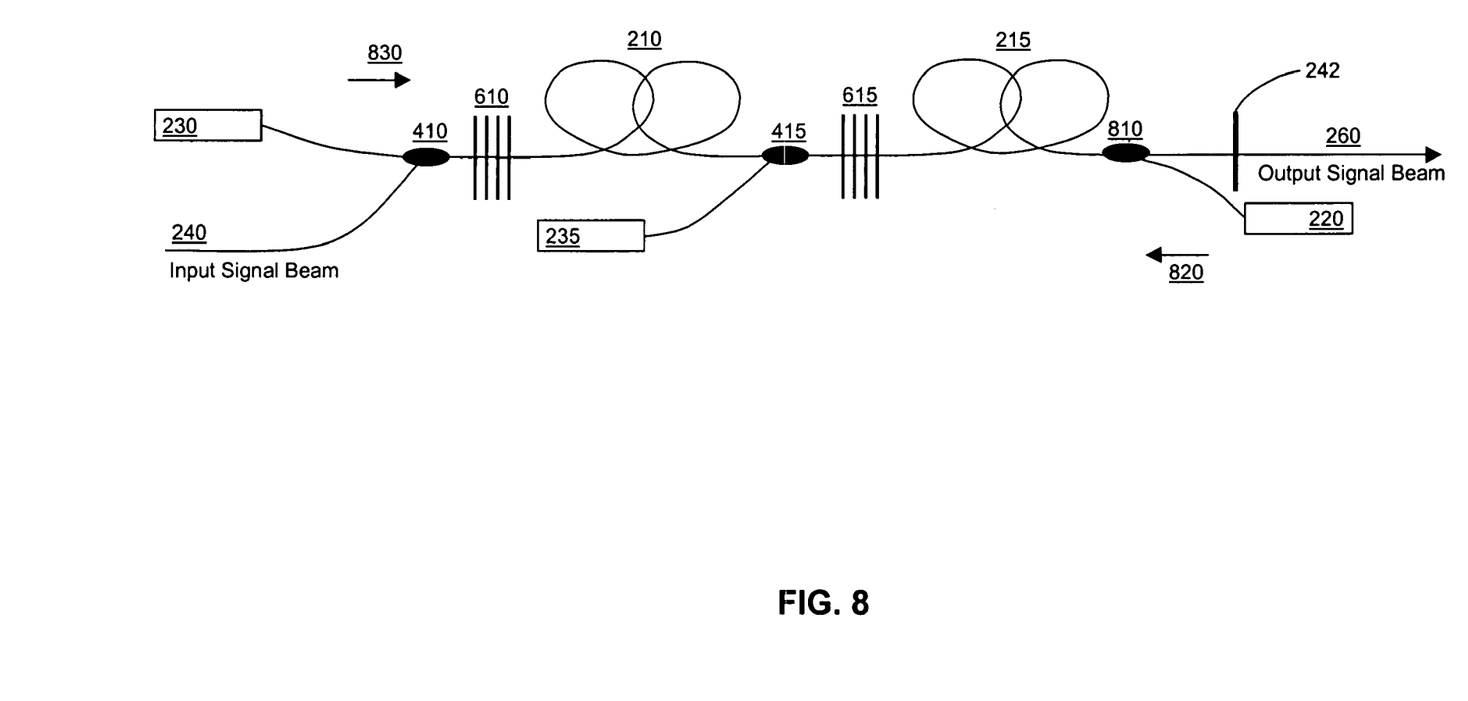
FIG. 8 is a block diagram of a device for shifting the frequency of a signal beam using a single, counterpropagating pump beam.

Embodiments are described above in which pump light beams copropagate with the reference and input signal beams, but this is not a requirement and other design configurations may be used. For example, FIG. 8 shows device 800 that implements counterpropagating light beams. In this figure, a single pump laser 220 introduces a pump light beam into second Raman medium 215 via coupler 810. Coupler 810 is similar to the other optical couplers described above, with the primary distinction that coupler 810 facilitates the coupling of the pump light beam generated by pump laser 220 into the optical fiber in a direction that is opposite to the propagation direction of the other light beams.

During operation, the pump light beam travels in direction 820, while input signal beam 240, the first reference beam generated by first reference laser 230, and the second reference beam generated by second reference laser 235, all propagate in direction 830. Although the pump light beam propagates in the opposite direction than the other light beams, device 800 operates in a manner that is similar to the single pump beam device depicted in FIG. 5.

Figure 9:
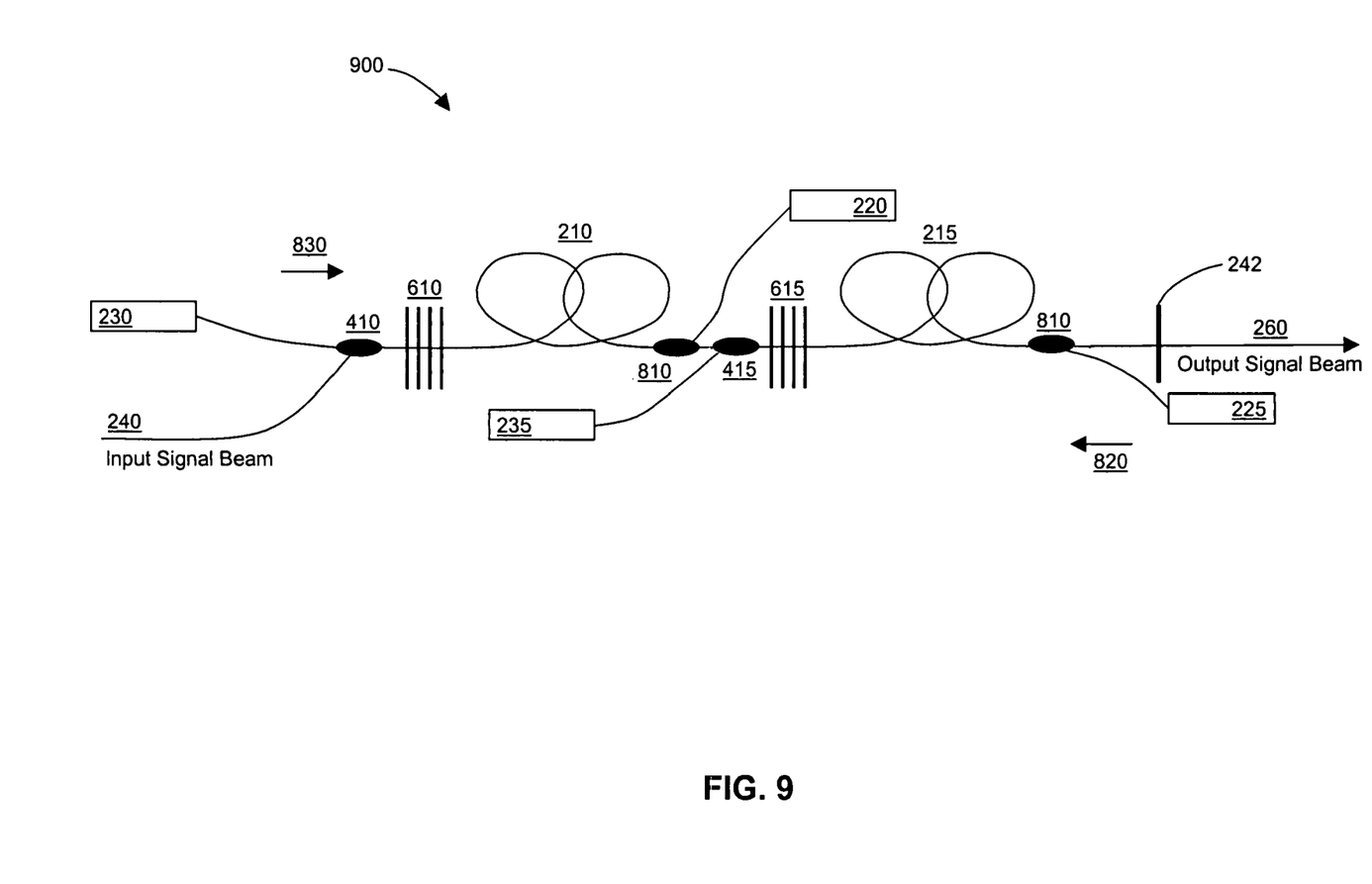
FIG. 9 is a block diagram of a device for shifting the frequency of a signal beam using two pump beams that counterpropagate relative to an input signal beam.

In another alternative, shown in FIG. 9, first and second pump lasers 220 and 225 are arranged so that they each introduce pump light beams that propagate in direction 820. In this design configuration, device 900 operates in essentially the same manner as device 400 shown in FIG. 4.

Although frequency shifting an input signal beam having a single optical signal component is described above, the various techniques and design configurations apply equally to other types of frequency shifting. For example, an input signal beam that includes multiple optical signal components may be shifted in frequency. In operation, the input signal beam enters the first Raman medium which generates an intermediate signal beam having a corresponding number of optical signal components. The intermediate signal beam propagates through the second Raman medium to generate an output signal beam that includes the same number of optical signal components, each of which that has been shifted in frequency. That is, the optical signal components of the output signal beam are all shifted by the same frequency shift.

Figure 10:
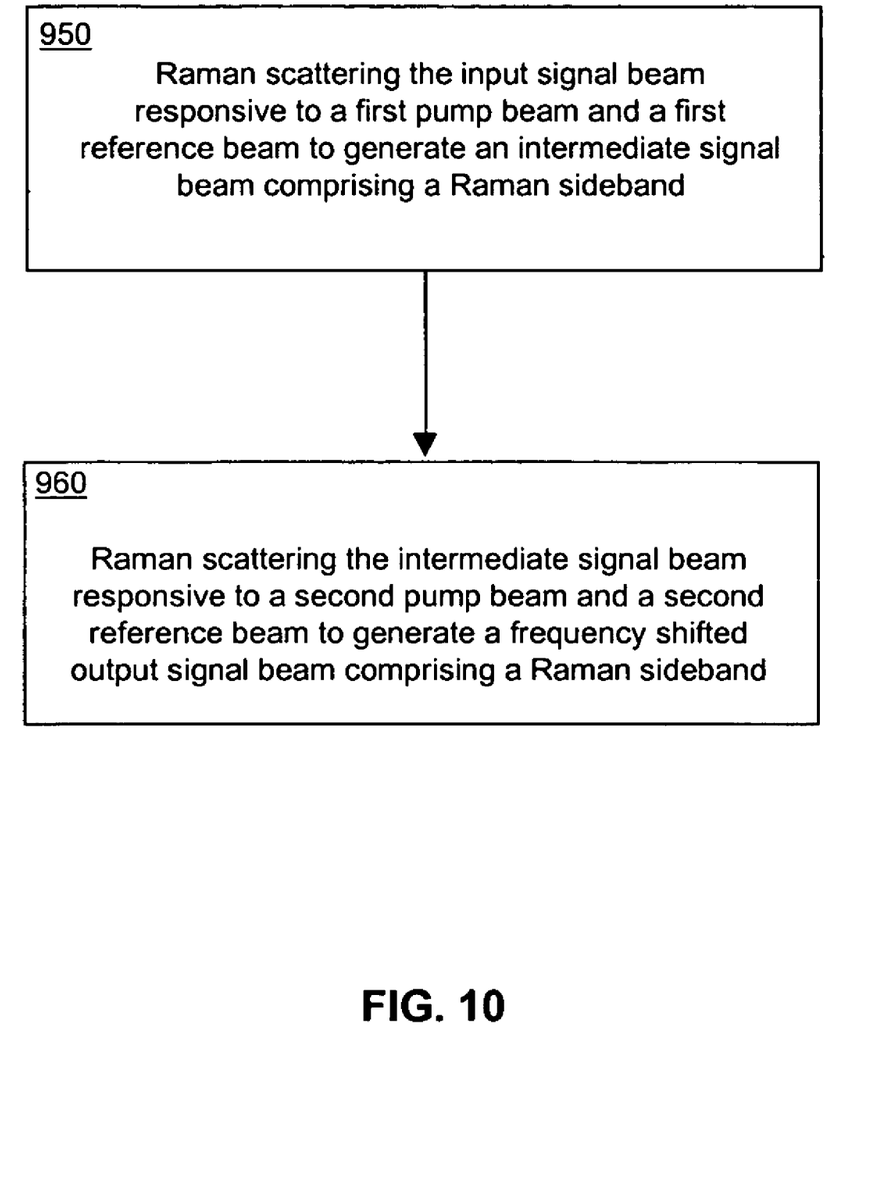
FIG. 10 is a flowchart showing exemplary operations for shifting the frequency of an input signal beam in accordance with embodiments of the invention.

FIG. 10 is a flowchart showing exemplary operations for implementing a device for shifting the frequency of an input signal beam according to some embodiments of the invention. At block 950, the input signal beam is subject to Raman scattering responsive to a first pump beam and a first reference beam to generate an intermediate signal beam. The intermediate signal beam may an upper or lower Raman sideband depending upon the conversion process implemented (up-conversion or down-conversion).

As indicated in block 960, the generated intermediate signal beam is subject to Raman scattering responsive to the second pump beam and a second reference beam to generate an output signal beam. If desired, the first pump beam may be used as the second pump beam to generate the output signal beam.

In some embodiments, the generated output signal represents the input signal and is shifted in frequency from the input signal by a frequency shift that corresponds to the frequency difference of the first and second reference beams. If the intermediate signal is generated using an upper Raman sideband, then the output signal beam is typically generated using a lower Raman sideband. Conversely, if the intermediate signal is generated using a lower Raman sideband, then the output signal beam may be generated using an upper Raman sideband.

While the invention has been described in detail with reference to disclosed embodiments, various modifications within the scope of the invention will be apparent. It is to be appreciated that features described with respect to one embodiment typically may be applied to other embodiments. Therefore, the invention properly is to be construed with reference to the claims.

What is claimed is:

1. Apparatus for optically shifting the frequency of an input signal beam by a frequency shift, said apparatus comprising:

a first Raman medium optically coupled to receive said input signal beam, a first pump beam, and a first reference beam, wherein said first Raman medium responsively generates an intermediate signal beam comprising a Raman sideband defined by said first Raman medium; and a second Raman medium optically coupled in series with said first Raman medium and additionally optically coupled to receive a second pump beam, and a second reference beam, wherein said second Raman medium responsively generates an output signal beam comprising a Raman sideband defined by said second Raman medium, and wherein said second reference beam differs in frequency from said first reference beam by said frequency shift.

2. The apparatus according to claim 1, wherein said first Raman medium comprises an optical fiber.

3. The apparatus according to claim 1, wherein said second Raman medium comprises an optical fiber.

4. The apparatus according to claim 1, wherein said first Raman medium comprises a fiber Bragg grating (FBG) structured to modulate propagation velocity of at least one of said beams propagating through said first Raman medium.

5. The apparatus according to claim 1, wherein said first Raman medium comprises fiber Bragg gratings (FBGs), wherein each of said FBGs is structured to modulate propagation velocity of a different one of said beams propagating through said first Raman medium.

6. The apparatus according to claim 1, wherein said second Raman medium comprises a fiber Bragg grating (FBG) structured to modulate propagation velocity of at least one of said beams propagating through said second Raman medium.

7. The apparatus according to claim 1, wherein said second Raman medium comprises fiber Bragg gratings (FBGs), wherein each of said FBGs is structured to modulate propagation velocity of a different one of said beams propagating through said second Raman medium.

8. The apparatus according to claim 1, wherein said intermediate signal beam comprises an upper Raman sideband of said first Raman medium, and said output signal beam comprises a lower Raman sideband of said second Raman medium.

9. The apparatus according to claim 1, wherein said intermediate signal beam comprises a lower Raman sideband of said first Raman medium, and said output signal beam comprises an upper Raman sideband of said second Raman medium.

10. The apparatus according to claim 1, wherein said first pump beam and said first reference beam copropagate through said first Raman medium.

11. The apparatus according to claim 1, wherein said first pump beam and said first reference beam counterpropagate through said first Raman medium.

12. The apparatus according to claim 1, wherein said second pump beam and said second reference beam copropagate through said second Raman medium.

13. The apparatus according to claim 1, wherein said second pump beam and said second reference beam counterpropagate through said second Raman medium.

14. The apparatus according to claim 1, wherein said first pump beam and said second pump beam are the same pump beam.

15. The apparatus according to claim 1, additionally comprising a source of said first pump beam and a source of said first reference beam.

16. The apparatus according to claim 1, additionally comprising a source of said second pump beam and a source of said second reference beam.

17. A method for optically shifting the frequency of an input signal beam by a frequency shift, said method comprising:
   Raman scattering said input signal beam responsive to a first pump beam and a first reference beam to generate an intermediate signal beam; and
   Raman scattering said intermediate signal beam responsive to a second pump beam and a second reference beam to generate an output signal beam, wherein said second reference beam differs in frequency from said first reference beam by said frequency shift.

18. The method according to claim 17, additionally comprising:
   providing an optical fiber; and
   wherein said Raman scattering of said input signal beam is performed using said optical fiber.

19. The method according to claim 17, additionally comprising:
   providing an optical fiber; and
   wherein said Raman scattering of said intermediate signal beam is performed using said optical fiber.

20. The method according to claim 17, additionally comprising:
   modulating the propagation velocity of at least one of said beams.

21. The method according to claim 20, wherein said modulating is performed during said Raman scattering of said input signal beam.

22. The method according to claim 20, wherein said modulating is performed during said Raman scattering of said intermediate signal beam.

23. The method according to claim 17, additionally comprising:
   selecting an upper Raman sideband resulting from said Raman scattering of said input signal beam as said intermediate signal beam; and
   selecting a lower Raman sideband resulting from said Raman scattering of said intermediate signal beam as said output signal beam.

24. The method according to claim 17, additionally comprising:
   selecting a lower Raman sideband resulting from said Raman scattering of said input signal beam as said intermediate signal beam; and
   selecting an upper Raman sideband resulting from said Raman scattering of said intermediate signal beam as said output signal beam.

25. The method according to claim 17, additionally comprising: copropagating said first pump beam and said first reference beam.

26. The method according to claim 17, additionally comprising: counterpropagating said first pump beam and said first reference beam.

27. The method according to claim 17, additionally comprising: copropagating said second pump beam and said second reference beam.

28. The method according to claim 17, additionally comprising: counterpropagating said second pump beam and said second reference beam.

29. The method according to claim 17, additionally comprising: utilizing a single pump beam for said first pump beam and said second pump beam.

* * * * *

UNITED STATES PATENT AND TRADEMARK OFFICE
CERTIFICATE OF CORRECTION

PATENT NO. : 7,016,102 B2  
APPLICATION NO. : 10/795034  
DATED : March 21, 2006  
INVENTOR(S) : Trutna, Jr. et al.

It is certified that error appears in the above-identified patent and that said Letters Patent is hereby corrected as shown below:

On the face page, in field (56), "Foreign Patent Documents", after "3/2004" insert -- H01S/3/30 --.

Signed and Sealed this

Eleventh Day of July, 2006

JON W. DUDAS  
*Director of the United States Patent and Trademark Office*